(12) United States Patent
Zhang et al.

(10) Patent No.: US 11,961,109 B2
(45) Date of Patent: Apr. 16, 2024

(54) MULTI-OBJECTIVE CUSTOMER JOURNEY OPTIMIZATION

(71) Applicant: ADOBE INC., San Jose, CA (US)

(72) Inventors: Lei Zhang, Fremont, CA (US); Jun He, Fremont, CA (US); Tingting Xu, Boston, MA (US); Jalaj Bhandari, New York, NY (US); Wuyang Dai, Santa Clara, CA (US); Zhenyu Yan, Cupertino, CA (US)

(73) Assignee: ADOBE INC., San Jose, CA (US)

( * ) Notice: Subject to any disclaimer, the term of this patent is extended or adjusted under 35 U.S.C. 154(b) by 465 days.

(21) Appl. No.: 16/742,386

(22) Filed: Jan. 14, 2020

(65) Prior Publication Data

US 2021/0217047 A1    Jul. 15, 2021

(51) Int. Cl.
| | |
|---|---|
| *G06Q 30/00* | (2023.01) |
| *G06F 18/20* | (2023.01) |
| *G06N 3/08* | (2023.01) |
| *G06N 20/00* | (2019.01) |
| *G06Q 10/107* | (2023.01) |
| *G06Q 30/0207* | (2023.01) |

(52) U.S. Cl.
CPC ....... *G06Q 30/0239* (2013.01); *G06F 18/295* (2023.01); *G06N 3/08* (2013.01); *G06N 20/00* (2019.01); *G06Q 10/107* (2013.01)

(58) Field of Classification Search
CPC ... G06Q 30/0207–0277; G06K 9/6297; G06N 20/00; G06N 3/088; G06N 7/005
See application file for complete search history.

(56) References Cited

U.S. PATENT DOCUMENTS

| | | | | |
|---|---|---|---|---|
| 2011/0179067 A1* | 7/2011 | Dalvi | ................. | G06F 16/2379 |
| | | | | 707/769 |
| 2017/0148035 A1* | 5/2017 | Yadagiri | ............ | G06Q 30/0201 |
| 2017/0316463 A1* | 11/2017 | Pielot | ................ | H04W 52/0251 |
| 2017/0364930 A1* | 12/2017 | Kannan | ............... | G06Q 30/0269 |
| 2018/0225589 A1* | 8/2018 | Ghavamzadeh | ....... | G06N 20/00 |
| 2018/0357552 A1* | 12/2018 | Campos | ................. | G06N 5/043 |
| 2019/0095796 A1* | 3/2019 | Chen | ...................... | G06N 3/045 |
| 2019/0272465 A1* | 9/2019 | Kimura | .................. | G06N 3/006 |
| 2020/0034884 A1* | 1/2020 | Ramanuja | ........... | G06Q 30/0254 |
| 2020/0160168 A1* | 5/2020 | Yang | ....................... | G06N 3/006 |
| 2020/0186846 A1* | 6/2020 | Mishra | ............. | H04N 21/25891 |
| 2020/0293568 A1* | 9/2020 | Lu | ....................... | G06Q 30/0255 |
| 2021/0323167 A1* | 10/2021 | Hemes | ................. | B25J 11/0065 |

\* cited by examiner

*Primary Examiner* — Luis A Brown
(74) *Attorney, Agent, or Firm* — F. CHAU & ASSOCIATES, LLC (57) ABSTRACT

Systems and methods for customer journey optimization in email marketing are described. The systems and methods may identify a plurality of messages for a first time period, wherein the plurality of messages are categorized according to a plurality of messages types, identify user information for a customer, wherein the user information includes user interaction data, determine a message type from the plurality of message types for the first time period based on the user information, wherein the message type is determined using a decision making model comprising a deep Q-learning neural network, select a message from the plurality of messages based on the determined message type, and transmit the message to the customer during the first time period based on the selection.

13 Claims, 7 Drawing Sheets

MULTI-OBJECTIVE CUSTOMER JOURNEY OPTIMIZATION

BACKGROUND

The following relates generally to marketing, and more specifically to customer journey optimization in email marketing.

Email marketing is a common way for businesses to communicate with their customers. In many cases, a marketer will send customers multiple emails over time (along with other marketing messages or events) to encourage them to purchase products and services. Businesses may employ a variety of customer journey optimization strategies to determine a schedule for marketing message delivery to customer, where "customer journey optimization" refers to the process of coordinating customer interactions to influence the end-to-end customer experience.

However, conventional marketing strategies often fail to take into account previous customer interactions, or the variety of messaging options available. This may result in inefficient marketing campaigns that cause customers to form a negative opinion of the marketer, unsubscribe from a mail list, or refrain from purchasing potentially useful products and services.

SUMMARY

A method and apparatus for customer journey optimization in email marketing are described. Embodiments of the method and apparatus may compute a Markov Decision Process (MDP) model comprising an action set including a plurality of message types; identify a plurality of messages for a first time period, wherein the plurality of messages are categorized according to the plurality of message types; identify user information for a customer, wherein the user information includes user interaction data; determine a message type from the plurality of message types for the first time period using the MDP model and the user information; select a message from the plurality of messages based on the determined message type; and transmit the message to the customer during the first time period based on the selection.

A method and apparatus for customer journey optimization in email marketing are described. Embodiments of the method and apparatus may identify training data representing a plurality of message types and customer response data corresponding to a plurality of response options, determine a plurality of reward parameters, wherein each of the plurality of reward parameters corresponds to a message type from the plurality of message types and a response option from the plurality of response options, identify an MDP model including a reward function based on the plurality of reward parameters, and train a machine learning network based on the MDP model using the training data.

A system for customer journey optimization in email marketing is described. Embodiments of the system may include a database storing user interaction data for a plurality of customers, a message generation component configured to generate messages corresponding to a plurality of message types, a decision making component comprising a machine learning network trained to select messages for each of the plurality of customers based on the interaction data and the plurality of message types, a message transmission component configured to transmit the messages to the customers, and a data collection component configured to collect additional interaction data based on the transmitted messages.

DETAILED DESCRIPTION

The present disclosure provides systems and methods for using Reinforcement Learning (RL) to perform customer journey optimization for a marketing campaign. Businesses often send emails to customers to encourage them to purchase products and services. Sending too many emails, or sending the wrong type of email, can cause customers to disengage or unsubscribe from a mail list. By contrast, gradually increasing, or nurturing, the customers' interests in a product can be a successful method of email marketing.

For example, using tailored or unique useful content can nurture a customer into trusting a product. Educational or encouraging content can include tips that lead to increased working efficiency if the customer uses the advertised product. Promotional emails (i.e., special discounts and temporary offers) may also be sent to potential customers to help customers save money when they purchase a product or service.

Conventionally, marketers have used "batch email" methods to send a wave of emails at fixed days and times to potential customers. Batch emails typically include similar content in all of the emails. The days and times may be randomly picked, or picked to coincide with holidays, etc. However, customer interests may differ from person to person, based on a multitude of human factors. Additionally, customer opinion of the advertised product may vary. Thus, sending batch emails with similar content to a large number of recipients may not be optimal. For example, some customers may be ready to purchase while other customers may not. Sending conversion type emails to customers that are not ready to buy may cause them to disengage or unsubscribe from the mail list.

Furthermore, customers may have different open and click behaviors at different times during the day. Thus, sending a batch of emails all at the same time may not address individual customer behavior. This can reduce the potential possibility that individual customer opens and clicks on offers in the email. Finally, different customers may have different tolerances for email delivery frequency. That is, customers may get bored or frustrated if emails are sent too frequently, and the appropriate email rate may be different for different people. Failing to take this into account may cause some customers to unsubscribe from a mail list.

Other marketers have utilized more complex rule-based methods. In rule-based methods, marketers perform tests and summarize the result of the observation into a set of rules for sending email. For example, a rule may be: "if a customer has a high open rate, then send more emails to this customer". Marketers using rule-based methods sometimes utilize human behavioral experts to run and observe the tests. This can improve the rules, but it can also lead to complicated test procedures and introduce human error into the outcome. Thus, complex rule-based procedures may produce incorrect rules or cause errors in the implementation of the rules. In some cases, the rules may be contradictory and ambiguous. Thus, the implementation of marketing procedures may be difficult when there are too many empirical rules.

To address these issues, the present disclosure describes a trained, personalized email delivery system for individual recipients of a subscriber list based on the recipient's behavior including participation, interest, and habits. Embodiments of the present disclosure may automatically select appropriate content for an individual recipient based on an individual's interest level in the product, and select an optimized day and time to send messages. The content can be selected based on a categorization of emails into email categories such as "nurture," "promotional," and "conversion" emails. Each email may be delivered based on an individual recipient's email checking habits. For example, embodiments of the present disclosure may help avoid recipient fatigue by adjusting delivery frequency based on individual's receptiveness to email.

Embodiments of the present disclosure make periodic decisions about what type of email to send and the time of day to send it based on a decision making model trained using a reinforcement learning technique. The model may then be updated based on individual recipient's responses or interactions. For example, delivery patterns may be automatically adjusted based on the latest response. In some cases, additional statistical methods may be used to explore and uncover recipients' behavior and train the model to generate new delivery patterns.

Thus, the present disclosure enables marketers to automatically select appropriate content to deliver, and an appropriate time to deliver it, based on each individual recipient's interest level. Proper content can increase the number of conversions of interested users to potential buyers while nurturing neutral users to become interested in the product. As a result, the present disclosure provides opportunities for more efficient customer journey optimization that increase the message open and click probabilities. Ultimately, increasing customer responsiveness to an email campaign results in higher customer engagement and higher revenue for the business.

The following terms are used throughout the present disclosure.

The term "Reinforcement Learning (RL)" refers to a class of machine learning methods for solving sequential decision-making problems in which a decision making algorithm is updated based on a reward function. For example, an email marketing campaign may be viewed as a sequential decision making process in which the decision at each time period (e.g., each day) is how and when to communicate with a particular customer.

A "Markov Decision Process (MDP)" is a decision making model used in situations where outcomes are partially under the control of a decision maker (the agent), and partially random (or not controlled by the agent). An MPD is defined by four primary components: a state set, an action set, a transition function, and a reward function. Given these components, a policy function is chosen that selects an action at each time period, based on the state, to maximize the reward. Decisions are made by selecting an action according to the policy function. The selected action causes a state transition which determines the future state (along with other random factors), which in turn impacts future decisions.

The "state set" refers to how the set of possible states representing information that an agent has available to make a decision. For example, the set of states available to an agent in an email marketing context may include customer profile information, time information, and information regarding customer responses to previous emails.

The "action set" refers to the set of actions that are available to an agent at any given time in an MDP. For example, an agent may decide whether to send an email, what time of day to send the email, and what type of email to send. Examples of different types of emails may include nurturing emails, promotional emails, and conversion emails.

The "reward function" refers to the function that specifies the relative value of different outcomes. For example, the reward function may specify a negative value for each email that is sent (to account for the fact that too many emails can overwhelm the customer) and a positive value for each time an email is opened, read, or clicked on. A positive value may also be associated with customer purchases, and a negative value may be associated with customer opt-out or unsubscribe.

The "policy function" refers to the function of an MDP that takes the current state as input and outputs an action (or a probability distribution over a set of actions). In other words, the policy function determines what decision the agent should make at any given time. The policy function may be implemented as a complex polynomial or with one or more neural networks. An agent seeks to find the optimal policy function that maximizes the reward function over time.

The term "Q-learning" refers to a model-free RL algorithm for learning a policy function of a decision making model. Q-learning is "model-free" because it doesn't require a deterministic model of the environment. Rather, it is based on a stochastic transition function between states. The "Q" in Q-learning refers to a "Quality function" that calculates the reward associated with a combination of a state and an action. At each time period during training a Q-learning network, the agent selects an action, observes the reward, enters a new state, and updates Q according to a weighted average of the old value and the new observation.

Figure 1:
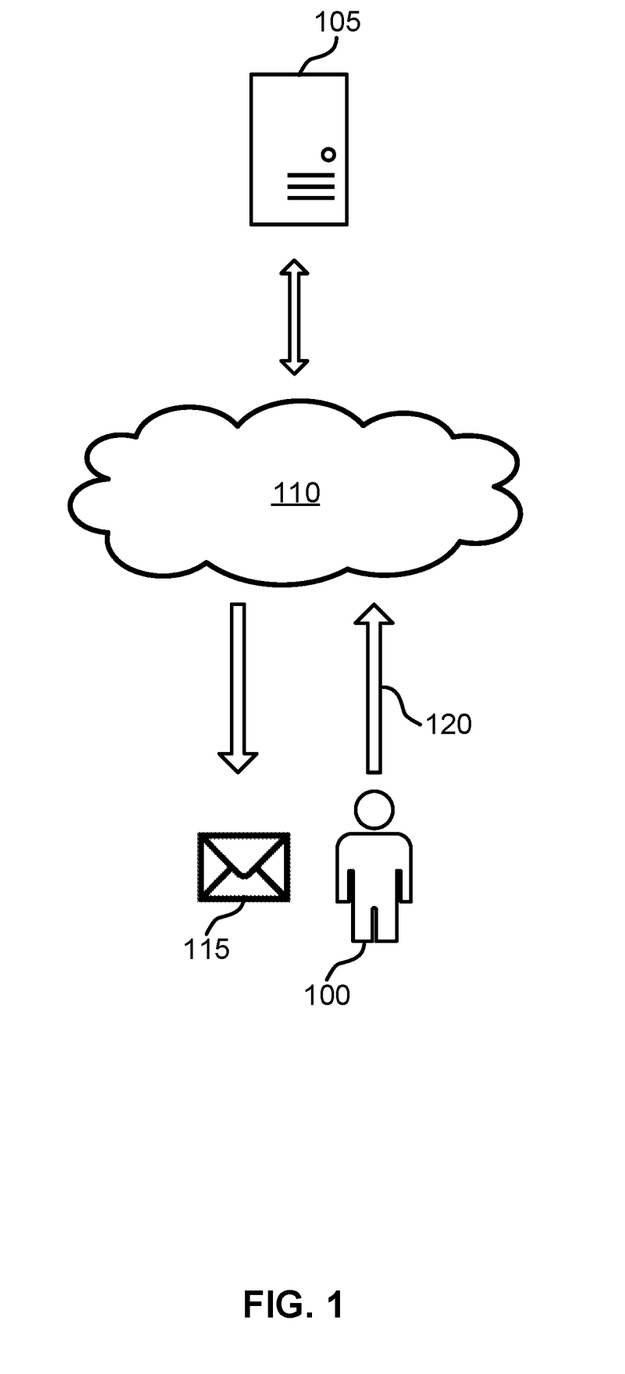
FIG. 1 shows an example of a system for customer journey optimization according to aspects of the present disclosure.

FIG. 1 shows an example of a system for customer journey optimization according to aspects of the present disclosure. The example shown includes user 100 (i.e., a potential customer), email marketing server 105, network 110, email 115, and interaction 120. Email marketing server 105 may be an example of, or include aspects of, the corresponding element or elements described with reference to FIG. 6.

The email marketing server 105 may represent a decision making agent employing a decision making model (e.g., an MDP) to decide when and how to send emails 115 or other marketing messages to the user 100 via network 110. After each email 115 is sent, the interaction 120, representing the response of the user 100 to the email 115, may be observed and collected by the email marketing server 105.

Thus, the email 115 may correspond to an action in the decision making model, which results in an update to the state, represented by the interaction 120. Then subsequent decisions about what kinds of email 115 to send may be made based on the updated state. In some cases, the interaction 120 may also be used to update the model itself (as opposed to just the representation of the state within the model). For example, the interaction 120 may be added to the set of training data that is used to train a neural network used by the email marketing server 105.

To improve the training of the decision making model, and account for changes in customer behavior, the email marketing server 105 may employ a new behavior exploration algorithm that includes periodically randomizing the decision about how or when to send emails 115 to the user 100, as will be further described below.

Figure 2:
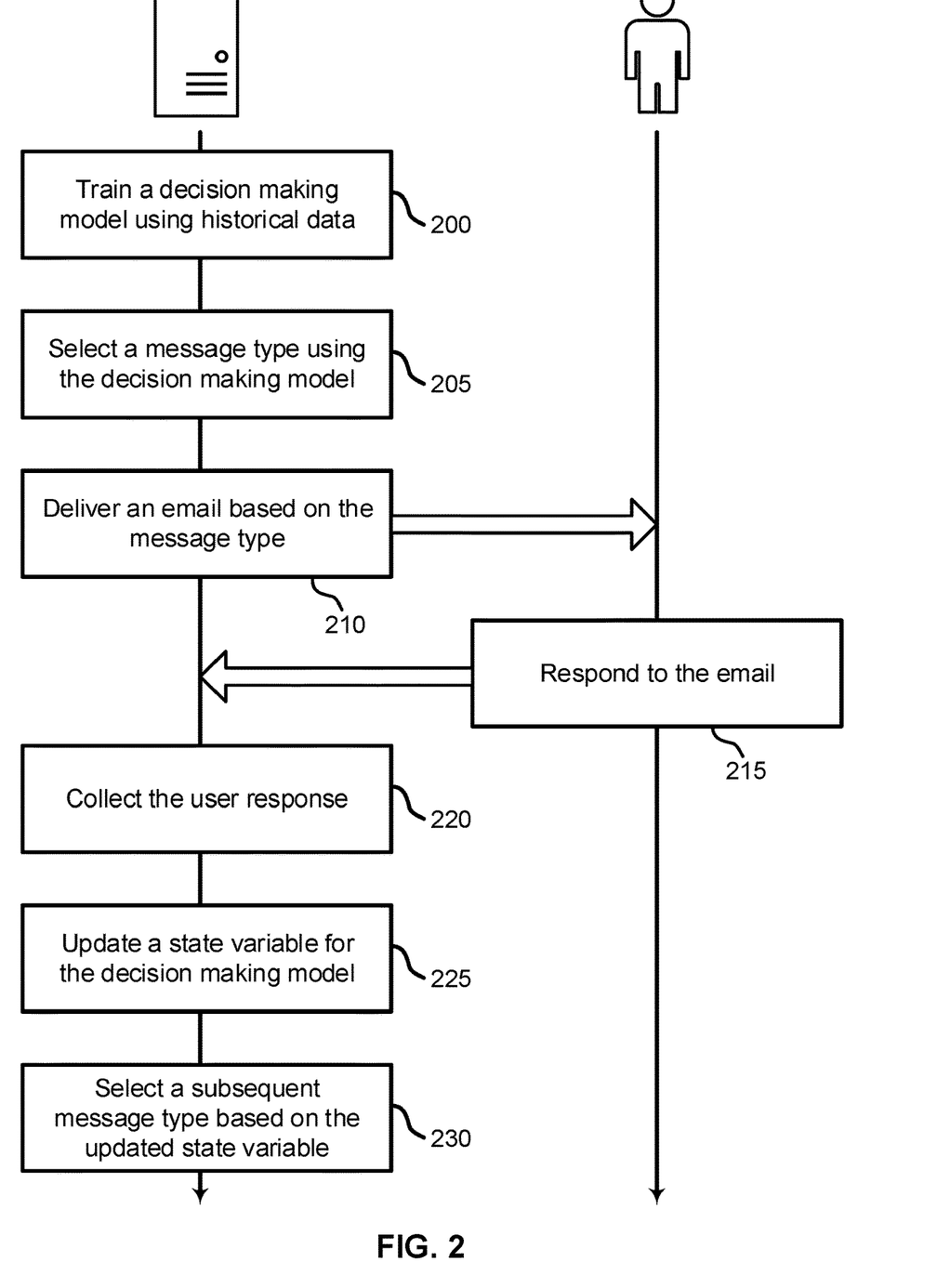
FIGS. 2 through 3 show examples of a process for customer journey optimization according to aspects of the present disclosure.

FIG. 2 shows an example of a process for customer journey optimization according to aspects of the present disclosure. Specifically, FIG. 2 shows an overview of an interaction between the user 100 and the email marketing server 105 described in FIG. 1.

At operation 200, the system trains a decision making model (e.g., an MDP model) using profile information and historical data. For example, the profile information may include demographic information about a user (i.e., a potential customer), and the historical information may include information about how the user has interacted with previously sent emails.

The decision making model may include a set of states describing possible input information, a set of actions including different message types (and the option of sending no message), a function describing how actions impact state transitions, and a reward function. In some embodiments, the decision making model may be implemented as a Q-learning neural network. The neural network may be trained using data from previous emails that have been sent to customers, and the response of the customers to those emails.

At operation 205, the system selects a message type using the decision making model. Selecting the message type may correspond to selecting an action in a decision making model. The message type may be a nurture message type, a promotional message type, a conversion message type, or a decision not to send any email at all during the time period. The message type may be selected to ensure proper content is delivered to each individual customer based on the individual's interest level in a product (as represented in their profile information, which may include a history of their interactions with previous emails, advertising content, or software applications.)

At operation 210, the system delivers an email based on the message type. In some cases, a decision is made to not send any email during a time period. That is, sending too many emails may cause a negative reaction, such as causing a potential customer to unsubscribe from a mailing list. Thus, during some periods a marketer will refrain from sending any email. By sending message during some time periods and not others, the delivery frequency may be adjusted to prevent customer fatigue. In some cases, the operations of steps 200, 205 and 210 may be performed by an email marketing server as described with reference to FIGS. 1 and 6.

At operation 215, the user responds to the email. The response to the email may include opening the email, not opening the email, clicking on the email, or unsubscribing from the mail list. In some cases, the operations of this step may be performed by a user as described with reference to FIG. 1.

At operation 220, the system collects the user response, and at operation 225, the system updates a state variable for the decision making model. For example, the state variable may be a state variable of the decision making model of the decision making process for sending email marketing messages.

At operation 230, the system selects a subsequent message type based on the updated state variable. For example, selecting the subsequent message type may represent an action during a subsequent time period within the decision making model. Thus, the system may automatically adjust a recipient's delivery pattern based on the latest response. In some cases, the operations of steps 220, 225, and 230 may be performed by an email marketing server as described with reference to FIGS. 1 and 6.

Customer Journey Optimization

Figure 3:
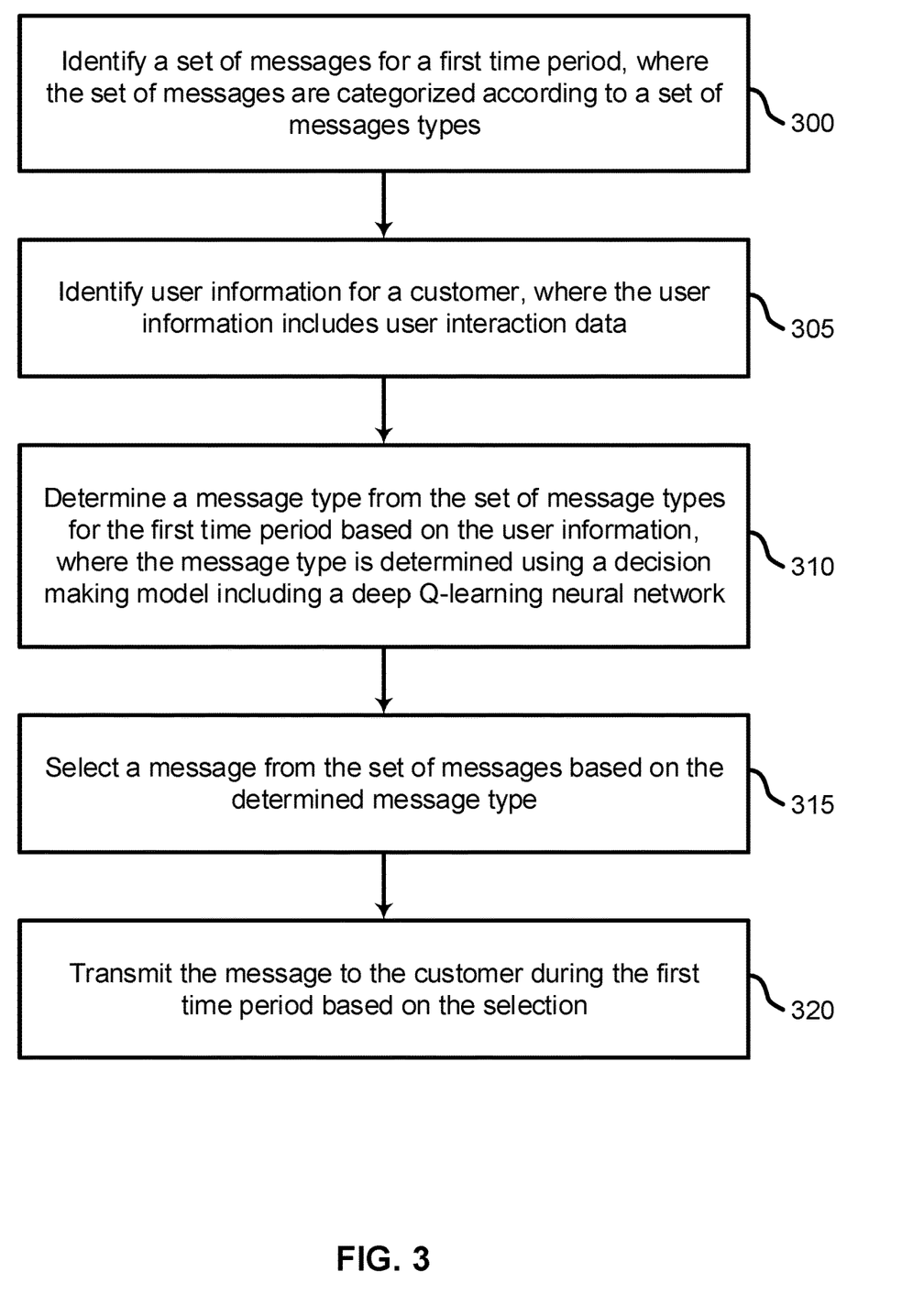

FIG. 3 shows an example of a process for customer journey optimization according to aspects of the present disclosure. In some examples, these operations may be performed by a customer journey optimization system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 300, the system identifies a set of messages for a first time period, where the set of messages are categorized according to a set of message types. In one example, the set of messages may include messages of a nurture message type, a promotional message type, a conversion message type. However, other messages types are possible. For example, a distinction may be made between educational, exciting, or humorous message types, or message types that are tailored to certain types of users with different demographic profiles. In some cases, the operations of this step may be performed by a message generation component as described with reference to FIG. 6.

At operation 305, the system identifies user information for a customer, where the user information includes user interaction data. The interaction data may include a history of how the user has responded to previous emails of different types (e.g., whether they opened and clicked, and at what time of day). The user information may also include profile information such as demographic information or user preferences gathered from other sources (e.g., information about whether and how often the user has interacted with software products, or marketing information gathered from other sources). In some cases, the user information corresponds to the state of a decision making model (e.g., an MDP). In some cases, the operations of this step may be performed by a database as described with reference to FIG. 6.

The state variable represents the current status of the user, and may include historical responses such as, but not limited to, a number of sent emails, a number of opened emails, a number of clicked emails, a number of opt-outed emails, or send recency of emails. The state variable may also include profile information such as, but not limited to, age, registration time, country, or category.

TABLE 1

Example Interaction data

| "Nurture"-type | "Promo"-type | "Conversion"-type |
|---|---|---|
| Number of sent emails | Number of sent emails | Number of sent emails |
| Number of opened emails | Number of opened emails | Number of opened emails |
| Number of clicked emails | Number of clicked emails | Number of clicked emails |
| Number of opt-outed emails | Number of opt-outed emails | Number of opt-outed emails |
| Send recency of emails | Send recency of emails | Send recency of emails |

At operation 310, the system determines a message type from the set of message types for the first time period based on the user information, where the message type is determined using a decision making model including a deep Q-learning neural network. In some cases, the operations of this step may be performed by a decision making component as described with reference to FIG. 6.

That is, email delivery can be formulated as a decision making model (e.g., an MDP) that includes a sequence of actions and a sequence of recipient responses. For example, a sequence of actions may be a recipient opening the email or clicking on the email. The decision making model attempts to maximize a reward function by increasing the open and click rate and preventing the customer from unsubscribing. An example, of the different rewards is shown in Table 2.

TABLE 2

Example Rewards for Different Outcomes

| Reward | Nurture | Promo | Conversion |
|---|---|---|---|
| Send | −1 | −1.8 | −4 |
| Open | 2.85 | 6 | 12.5 |
| Click | 10 | 30 | 50 |
| Opt-out | −85 | −85 | −85 |

According to table 2, feedback responses to emails include Send, Open, Click, and Opt-out. Send responses may be set to a negative reward. Click responses may be set to a high reward. Open responses may be set between Open and Click responses. In some examples, responses to conversion methods may be set to the highest reward. Responses to nurture methods may be set to a lower reward. Responses to promo methods are set between nurture and conversion methods. Opt-out responses may be set to the lowest reward for any result.

Then, a recipient's instantaneous rewards at time t can be defined as:

$$r_t = \Sigma_{i,k} a_{i,k} * \text{Response}_{i,k}(t) \quad (1)$$

According to this example, a recipient's life time rewards can be defined as:

$$R = \Sigma_t r_t \quad (2)$$

where i is an email type id, and k is a response id. Responses can include binary Responses such as open, unopen, click, optout, conversion, Download, purchase, etc. or numeric responses such as a purchase amount. The term $a_{i,k}$ is the reward for the response type k of email type i. For responses that negatively impact business outcomes, such as "unopen" or "opt-out," $a_{i,k}<0$, for all i, and for responses that have a positive impact, $a_{i,k}>0$, for all i.

In another example, a recipient's instantaneous rewards can be modeled by:

$$r_t = a_i * \text{Open}_i(t) + b_i * \text{Click}_i(t) - c_i * \text{Unopen}_i(t) - d_i * \text{Optout}_i(t) \quad (3)$$

Accordingly, a recipient's lifetime rewards can be modeled by:

$$R = \Sigma_t a_i * \text{Open}_i(t) + b_i * \text{Click}_i(t) - c_i * \text{Unopen}_i(t) - d_i * \text{Optout}_i(t), \quad (4)$$

where: i is an email type id, such as conversion, nurture, or promo emails. $\text{Open}_i(t)$ is a binary variable, where if a recipient opens but does not click an email at time t, then $\text{Open}_i(t)=1$; otherwise $\text{Open}_i(t)=0$. Variable $a_i$ is a reward for each open of type i email. Variable Click(t) is a binary variable, where if a recipient opens and clicks an email of type i at time t, then $\text{Click}_i(t)=1$; otherwise $\text{Click}_i(t)=0$. Variable $b_i$ is the reward for each click of email type i. Variable $\text{Unopen}_i(t)$ is a binary variable, where if an email of type i is sent to the recipient but not opened at time t, then $\text{Unopen}_i(t)=1$; otherwise $\text{Unopen}_i(t)=0$. Variable $c_i$ is the penalty for each email being sent of email type i. Variable $\text{Optout}_i(t)$ is a binary variable, where if a recipient decides to opt-out of an email at time t when a given email type i was sent, then $\text{Optout}(t)=1$, otherwise $\text{Optout}_i(t)=0$. Variable $d_i$ is the opt-out penalty for type i email.

The decision making model may be based on a reinforcement learning framework. The decision making model may determine to send an email of type i at time t to maximize a recipient's total reward according to a policy function that depends on the state variable:

$$\pi(s) = \operatorname{argmax}_{\pi \in \Pi} \mathbb{E}\left[ \sum_{t=0}^{\infty} \gamma^t r_t \,\Big|\, s_0 = s \right] \quad (5)$$

where: Variable s is the state variable representing a recipient's profile and historical response information. Variable γ is a discount factor. The discount factor represents a trade-off between instantaneous and future rewards. Variable $r_t$ is an instantaneous reward at time t, shown above, and w is a sequence of actions, and Π is all the feasible actions within the period.

At operation 315, the system selects a message from the set of messages based on the determined message type. In some cases, the operations of this step may be performed by a decision making component as described with reference to FIG. 6. In some cases, a time of day for transmitting the message may also be selected. The time of day may be based on a user information including a history of when and how the customer has responded to previous emails or messages.

At operation 320, the system transmits the message to the customer during the first time period based on the selection. In some cases, the operations of this step may be performed by a message transmission component as described with reference to FIG. 6.

Thus, the workflow of a decision making model begins with the training of the decision making model using historical data. Next, a delivery decision is made, where the model determines if an email can be sent at a time t. If an email can be sent, the model also determines which type of email to send. A recipient's response to that delivery is then collected. An update-state variable s is determined, based on the latest response. Lastly, a new delivery decision is determined, for the next time stage t+1, based on the latest response.

New Behavior Exploration

Figure 4:
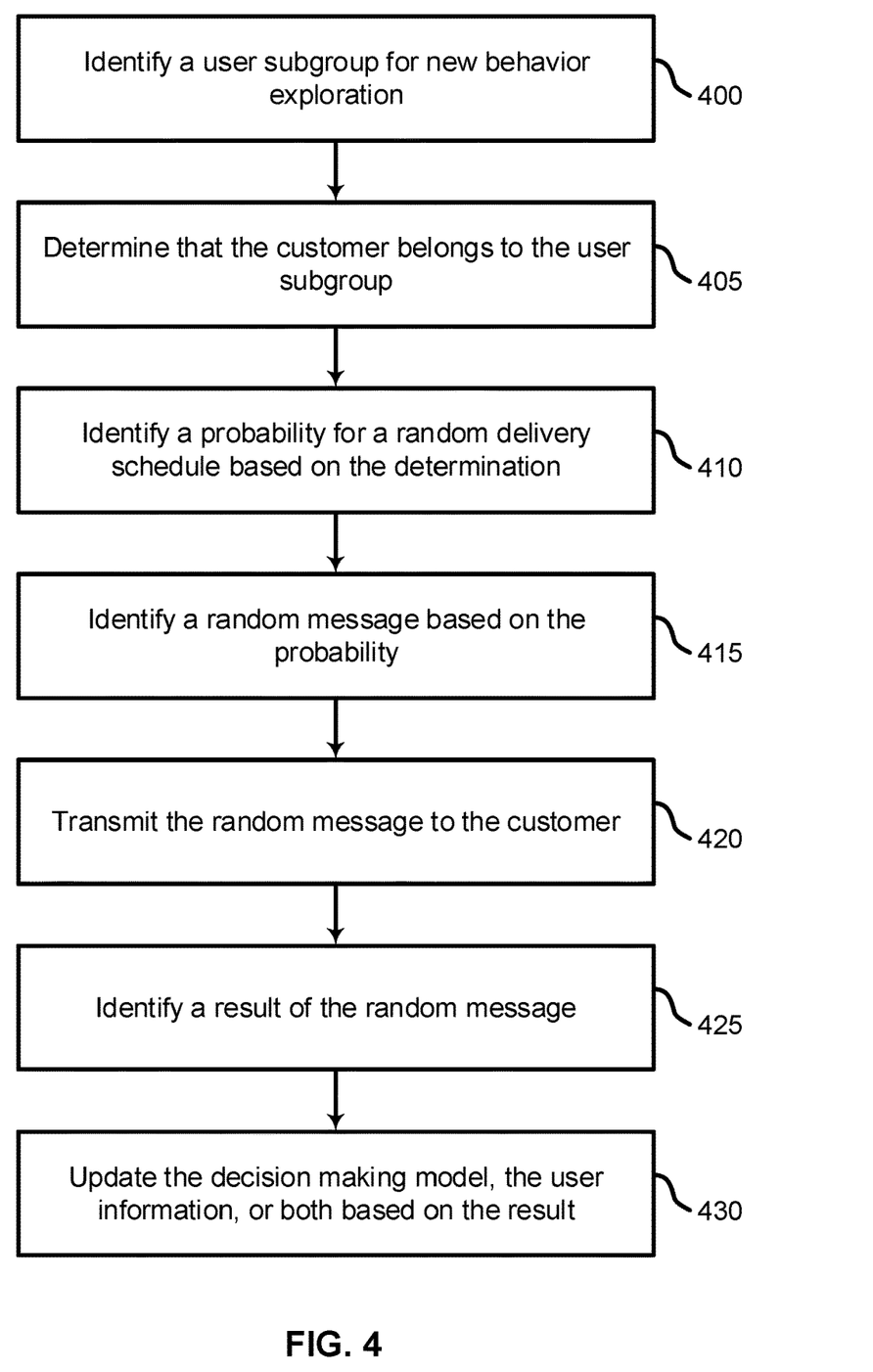
FIG. 4 shows an example of a process for new behavior exploration according to aspects of the present disclosure.

FIG. 4 shows an example of a process for new behavior exploration according to aspects of the present disclosure. In some examples, these operations may be performed by a customer journey optimization system including a processor executing a set of codes to control functional elements of an apparatus. Specifically, the operations may be performed by a behavior exploration component as described with reference to FIG. 6.

Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

The decision making model described above may be trained by historical data to utilize the recipient's response records to boost engagement in future emails. However, in some cases the decision making model may not explore the recipient's response at a certain time if there is a limited record in the recipient's historical data. In some cases, the exploration mechanism may be implemented after the delivery decision. Using the exploration mechanism, the customer journey optimization system may explore and uncover recipients' behavior to improve the model and generate new delivery patterns.

At operation 400, the system identifies a user subgroup for new behavior exploration (i.e., the set of users who will receive a randomized, exploratory email). At operation 405, the system determines that a particular customer belongs to the user subgroup. At operation 410, the system identifies a probability, e, for a random delivery schedule based on the determination. That is, even customers within the subgroup may receive exploratory emails at a low rate to ensure that the behavior exploration mechanism doesn't have a significant negative impact on performance.

At operation 415, the system identifies a random message based on the probability. That is, the random message is selected with a likelihood based on the probability. At operation 420, the system transmits the random message to the customer. At operation 425, the system identifies a result of the random message. At operation 430, the system updates the decision making model, the user information, or both based on the result. That is, the information collected after the behavior exploration email may be used to update the decision making model.

Thus, the customer journey exploration mechanism samples a subgroup population. The sampling criteria may be based on the recipient's historical response to deliveries. Recipients with a lower response rate may be assigned a higher probability to be selected. Recipients with a lower response rate provide low historical information, which may mean attempts to obtain a customer's information is excessively. In some cases, the addition of randomness to the model may cause a loss in performance. Therefore, the level of randomness added to each time step may be small. Specifically, a random delivery schedule may be generated and implemented according to a small probability, e. The delivery schedule is still based on the decision making model for non-randomized models.

Model Training

Figure 5:
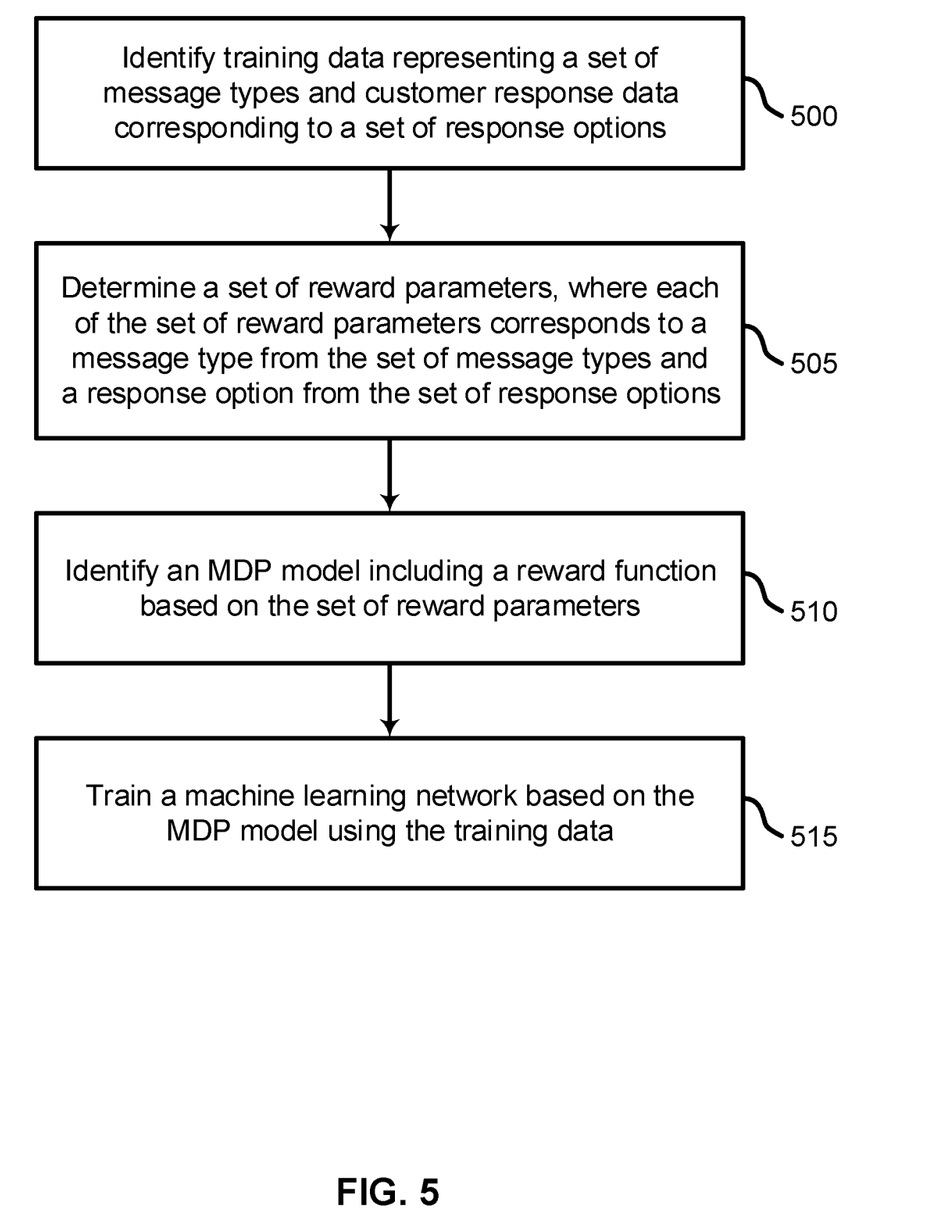
FIG. 5 shows an example of a process for training a decision making model according to aspects of the present disclosure.

FIG. 5 shows an example of a process for training a decision making model according to aspects of the present disclosure. In some examples, these operations may be performed by a customer journey optimization system including a processor executing a set of codes to control functional elements of an apparatus. Specifically, these operations may be performed by a training component as described with reference to FIG. 6.

Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

Prior to making decisions regarding when and how to send email, a customer journey optimization system may train a decision making model. At operation 500, the system identifies training data representing a set of message types and customer response data corresponding to a set of response options as described above with reference to FIG. 3. At operation 505, the system determines a set of reward parameters, where each of the set of reward parameters corresponds to a message type from the set of message types and a response option from the set of response options (as in FIG. 3).

At operation 510, the system identifies a decision making model (e.g., an MDP model) including a reward function based on the set of reward parameters. At operation 515, the system trains a machine learning network based on the decision making model using the training data.

Given a finite state-action pair (s,a), the decision making model can be obtained by approximating a Q function based on the reward function:

$$Q^{\pi}(s, a) = E\left[\sum_{t=0}^{\infty} \gamma^t r_t \mid s_0 = s, a_0 = a\right] \quad (6)$$

where $\mathbb{E}[\cdot]$ is the expectation over randomness of state transition, P(s'|s, a) and a is the action. The action can be to send an email or not to send an email. If sending an email, the type of email is determined.

The initial $Q^{\pi}(s,a)$ can be trained from historical data, by solving a Bellman equation:

$$Q^{\pi}(s,a) = r(s,a) + \gamma \Sigma_{s' \in S} P(s'|s,a) Q^{\pi}(s', \pi(s')) \quad (7)$$

obeying the dynamic programming principle:

$$Q^*(s,a) = r(s,a) + \gamma \Sigma_{s' \in S} P(s'|s,a) \max_{a \in A} Q^*(s',a) \quad (8)$$

To approximate Q*(s,a), a deep Q-learning neural network may be used.

In some example, separate models, (e.g., training and target networks), are used to train the parameters θ of a neural network of Q*(s,a). To reduce correlations between Q value and Target Q values, target network parameters are updated with the Q-network parameters at different steps. A deep Q learning network parameter updating strategy may be used to reduce overestimating values in the training stage. For example, equation 9 below represents a double deep Q learning parameter updating strategy:

Target value (9)

$$Y_t^{DoubleDQN} = r_t + \gamma Q_{TargetNet}\left(s_{t+1}, a_{t+1} = \operatorname*{argmax}_{a \in A} Q(s_{t+1}, a; \theta_t); \theta_t^-\right)$$

The decision making model may use the latest recipient response data to update and correct the model. The decision making model may automatically learn and update based on how the customer responds to an email. For example, if a customer opens an email, or clicks on a link in the email, it may be an indication that the customer is interested in the product and the system may be more likely to send promotional or conversion emails in the future. To update and correct the model, an importance sampling or a rejection sampling method can be used for sampling training data with a proposal distribution, where the latest data points provide for a higher probability of sampling.

An example of a distribution is:

$$\text{Probability of Accept this Sample} = \mu e^{-t} \tag{10}$$

where t is the time duration between the current time and event time, and is the control parameter of the distribution.

System Architecture

Figure 6:
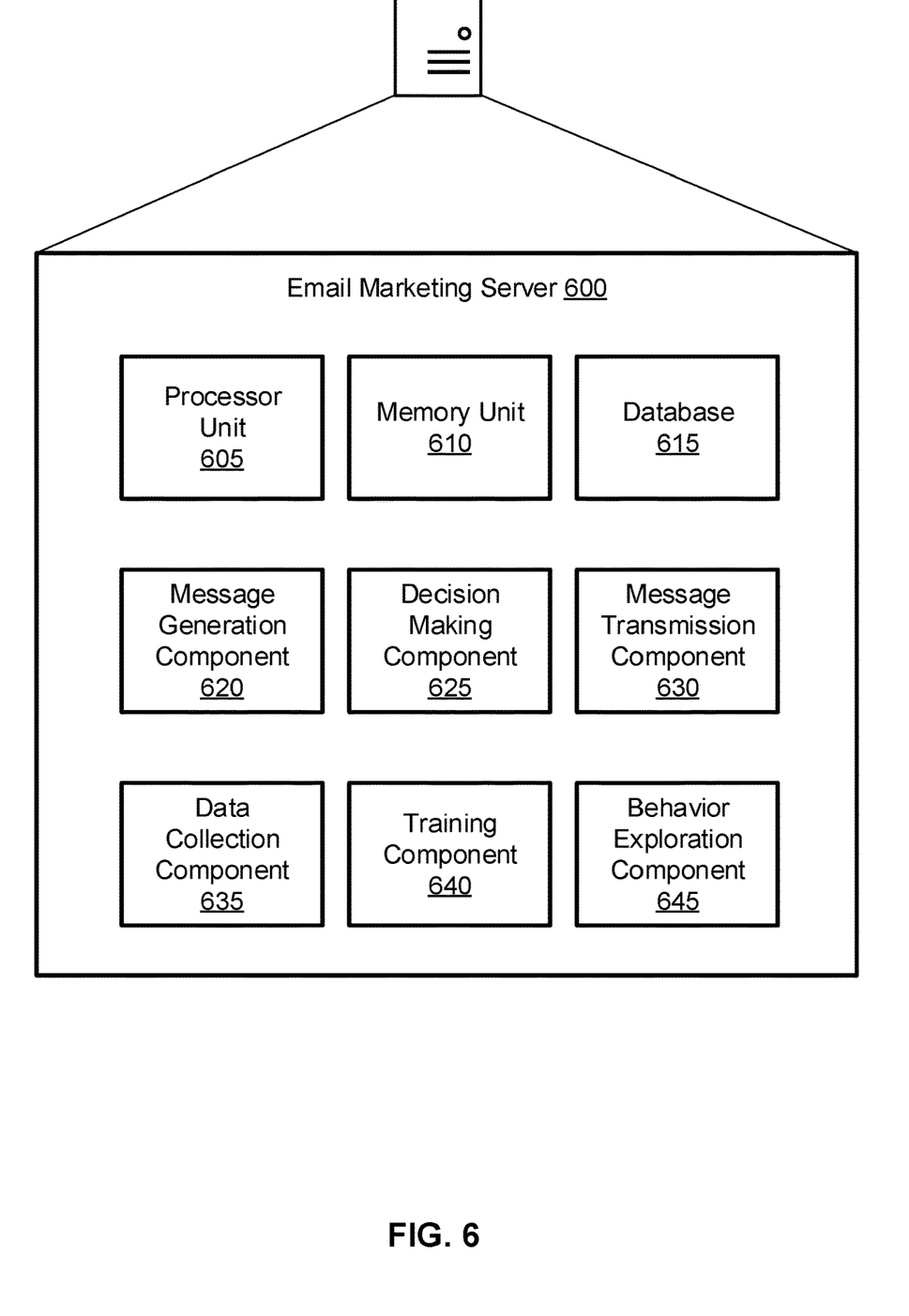
FIG. 6 shows an example of an email marketing server according to aspects of the present disclosure.

FIG. 6 shows an example of an email marketing server 600 according to aspects of the present disclosure. Email marketing server 600 may be a component of a customer journey optimization and may be an example of the corresponding element described with reference to FIG. 1. Email marketing server 600 may include processor unit 605, memory unit 610, database 615, message generation component 620, decision making component 625, message transmission component 630, data collection component 635, training component 640, and behavior exploration component 645.

A processor unit 605 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into processor. The processor may be configured to execute computer-readable instructions stored in a memory to perform various functions.

Memory unit 610 may include random access memory (RAM), read-only memory (ROM), or a hard disk. The memory may be solid state or a hard disk drive, and may store computer-readable, computer-executable software including instructions that, when executed, cause a processor to perform various functions described herein. In some cases, the memory may contain, among other things, a BIOS which may control basic hardware or software operation such as the interaction with peripheral components or devices. In some cases, a memory controller may operate memory cells as described herein. In some cases, memory controller may include a row decoder, column decoder, or both. In some cases, memory cells within a memory may store information in the form of a logical state.

Database 615 may store user interaction data for a plurality of customers. Database 615 may then identify user information for a customer or set of customers, where the user information includes user interaction data. In some examples, the user information further includes user profile information. Database 615 may also identify training data representing a set of message types and customer response data corresponding to a set of response options.

Message generation component 620 may identify a set of messages for a first time period, where the set of messages are categorized according to a set of messages types. Message generation component 620 may be configured to generate messages corresponding to a plurality of message types. In some examples, the set of messages include email marketing messages. In some examples, the set of message types includes a nurture type, a promotional type, and a conversion type, and where the message is selected based on the categorization.

Decision making component 625 may determine a message type from the set of message types for the first time period based on the user information, where the message type is determined using a decision making model which may include a deep Q-learning neural network. Decision making component 625 may also select a message from the set of messages based on the determined message type.

Decision making component 625 may also update a state variable for the decision making model based on the customer interaction. In some cases, decision making component 625 may refrain from transmitting to the customer during a subsequent time period based on the decision making model. In some examples, the decision making model is an MDP model.

Decision making component 625 may include a machine learning network trained to select messages for each of the plurality of customers based on the interaction data and the plurality of message types. In some examples, the machine learning network includes input nodes corresponding to features of the interaction data, one or more intermediate nodes, and output nodes corresponding to the message types. In some examples, the machine learning network includes an artificial neural network (ANN) such as a deep Q-learning network.

Message transmission component 630 may transmit the message to the customer during the first time period based on the selection. For example, Message transmission component 630 may transmit messages to at least a portion of a set of customers during a first time period based on an MDP model. Message transmission component 630 may also transmit random messages to the customer during a behavioral exploration process.

Data collection component 635 may identify a customer interaction in response to the message. Data collection component 635 may also identify a result of random messages during behavioral exploration. Data collection component 635 may be configured to collect additional interaction data based on additional transmitted messages.

Training component 640 may determine a set of reward parameters, where each of the set of reward parameters corresponds to a message type from the set of message types and a response option from the set of response options. Training component 640 may also identify a decision making model including a reward function based on the set of reward parameters. Training component 640 may then train a machine learning network based on the decision making model using the training data.

Training component 640 may also update a neural network based on subsequent customer interactions. Training component 640 may update the decision making model, the user information, or both based on the result. In some cases, training component 640 may train a training network and a target network, where target network parameters are updated based on parameters of the training network every C steps, where C is an integer greater than 1.

In some examples, the machine learning network includes a deep Q-learning neural network. In some examples, the machine learning network is trained based on a policy gradient for the decision making model. In some examples, the reward function includes a summation of an instantaneous rewards multiplied by a discount factor for each of a set of time periods as described above.

Behavior exploration component 645 may identify a user subgroup for new behavior exploration, determine that the customer belongs to the user subgroup, identify a probability for a random delivery schedule based on the determination, and identify a random message based on the probability.

Figure 7:
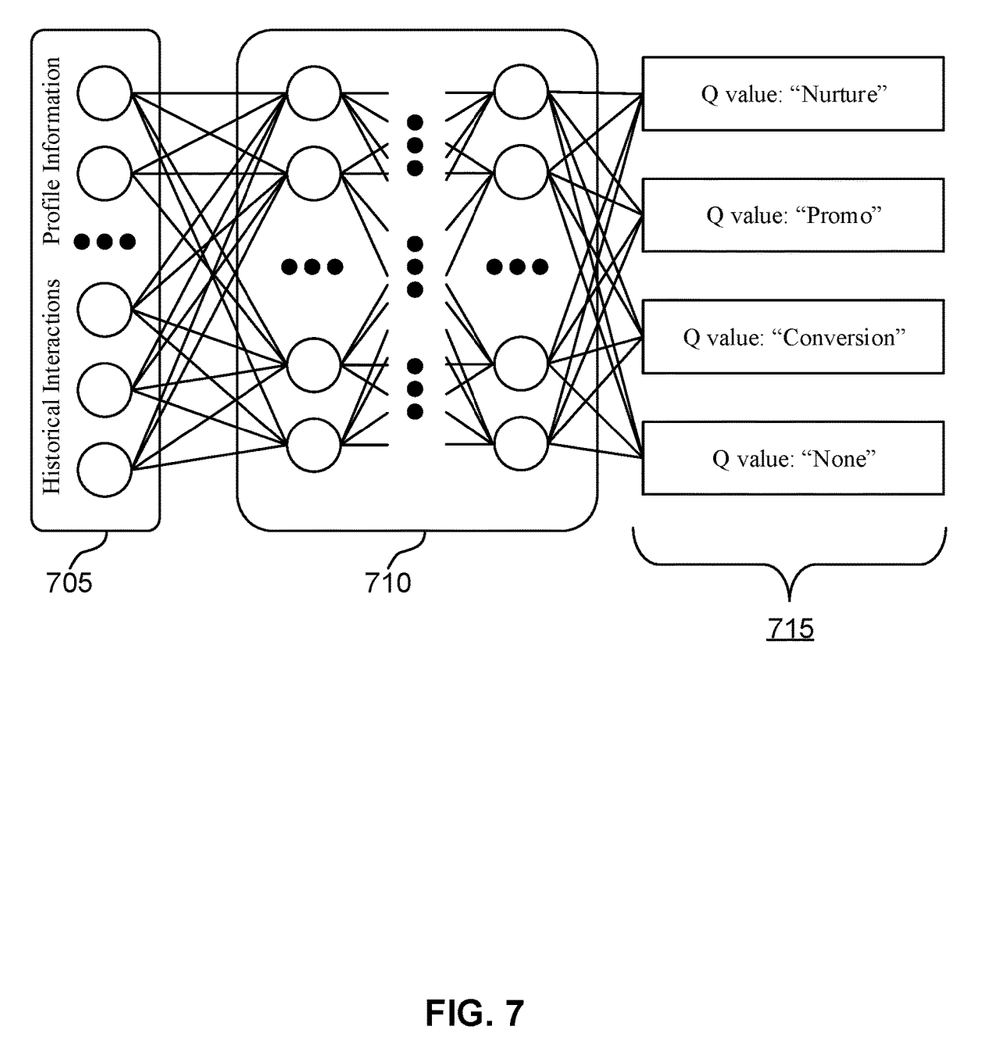
FIG. 7 shows an example of a network architecture for a decision making component according to aspects of the present disclosure.

FIG. 7 shows an example of a network architecture for a decision making component according to aspects of the present disclosure. The decision making component may include input 705, ANN 710, and output 715.

The input may include both profile information and historical interaction information, which may be combined into a feature vector used as input for the decision making component.

The ANN 710 may be a hardware or a software component that includes a number of connected nodes (a.k.a., artificial neurons), which may loosely correspond to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

In some examples, the node weights of the ANN 710 may be determined using deep Q-learning. During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

The output 715 may include a weight associated with each message type (i.e., a "nurture" message type, a "promo" message type, a "conversion" message type, or "none"). In some examples, the output 715 is a probability vector, where the highest value corresponds to the most suitable message type. A message (or no message) may then be selected and transmitted based on the output vector.

Accordingly, the present disclosure includes the following embodiments.

A method and apparatus for customer journey optimization in email marketing is described. The apparatus may include a processor, memory in electronic communication with the processor, and instructions stored in the memory. The method and apparatus may identify a plurality of messages for a first time period, wherein the plurality of messages are categorized according to a plurality of messages types, identify user information for a customer, wherein the user information includes user interaction data, determine a message type from the plurality of message types for the first time period based on the user information, wherein the message type is determined using a decision making model comprising a deep Q-learning neural network, select a message from the plurality of messages based on the determined message type, and transmit the message to the customer during the first time period based on the selection.

Some examples of the method and apparatus described above may further include identifying a customer interaction in response to the message. Some examples may further include updating a state variable for the decision making model based on the customer interaction. Some examples of the method and apparatus described above may further include refraining from transmitting to the customer during a subsequent time period based on the decision making model. Some examples of the method and apparatus described above may further include identifying a customer interaction in response to the message. Some examples may further include updating the deep Q-learning neural network based on the customer interaction.

Some examples of the method and apparatus described above may further include identifying a user subgroup for new behavior exploration. Some examples may further include determining that the customer belongs to the user subgroup. Some examples may further include identifying a probability for a random delivery schedule based on the determination. Some examples may further include identifying a random message based at least in part on the probability. Some examples may further include transmitting the random message to the customer. Some examples may further include identifying a result of the random message. Some examples may further include updating the decision making model, the user information, or both based on the result.

In some examples, the user information further comprises user profile information. In some examples, the plurality of messages comprise email marketing messages. In some examples, the plurality of message types comprises a nurture type, a promotional type, and a conversion type, and wherein the message is selected based on the categorization. In some examples, the decision making model comprises an MDP model.

A method and an apparatus for customer journey optimization in email marketing are described. The apparatus may include a processor, memory in electronic communication with the processor, and instructions stored in the memory. The method and apparatus may identify training data representing a plurality of message types and customer response data corresponding to a plurality of response options, determine a plurality of reward parameters, wherein each of the plurality of reward parameters corresponds to a message type from the plurality of message types and a response option from the plurality of response options, identify an MDP model including a reward function based on the plurality of reward parameters, and train a machine learning network based on the MDP model using the training data.

In some examples, the machine learning network comprises a deep Q-learning neural network. In some examples, the machine learning network is trained based on a policy gradient for the MDP model. In some examples, the reward function comprises a summation of an instantaneous rewards multiplied by a discount factor for each of a plurality of time periods.

Some examples of the method and apparatus described above may further include identifying user information for a plurality of customers. Some examples may further include transmitting messages to at least a portion of the plurality of customers during a first time period based on the MDP model. Some examples may further include identifying customer response data associated with the transmitted messages. Some examples may further include updating the machine learning network based on the customer response data.

Some examples of the method and apparatus described above may further include training a training network and a target network, wherein target network parameters are updated based on parameters of the training network every C steps, where C is an integer greater than 1.

A system for email marketing is described, the system comprising a database storing user interaction data for a plurality of customers; a message generation component configured to generate messages corresponding to a plurality of message types; a decision making component comprising a machine learning network trained to select messages for each of the plurality of customers based on the interaction data and the plurality of message types; a message transmission component configured to transmit the messages to the customers; and a data collection component configured to collect additional interaction data based on the transmitted messages.

In some examples, the machine learning network comprises input nodes corresponding to features of the interaction data, one or more intermediate nodes, and output nodes corresponding to the message types. In some examples, the machine learning network comprises a deep Q-learning network.

Some examples of the system described above may further include a training component configured to train the decision making component based on the user interaction data. In some examples, the plurality of types includes a nurture type, a promotional type, and a conversion type.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method of training a neural network, the method comprising:
    training a neural network representing a policy function of a Markov Decision Process (MDP) model comprising an action set including times of day and a plurality of message types corresponding to interest levels representing a user journey, wherein the neural network is trained based on user responses to each of the plurality of message types;
    identifying user information for a user, wherein the user information includes user interaction data indicating an interest level of the user at a point in the user journey;
    determining a message type from the plurality of message types using the neural network, wherein an input to the neural network includes a state variable based on the user information, and an output of the neural network comprises a probability vector including a plurality of values corresponding to the plurality of message types, respectively;
    selecting a message having the determined message type, wherein the message includes content appropriate for the interest level of the user;
    transmitting the message to the user;
    identifying a user interaction in response to the message;
    updating the neural network using reinforcement learning based on the user interaction; and
    identifying a user subgroup for new behavior exploration;
    determining that the user belongs to the user subgroup;
    identifying a probability for a random delivery schedule based on the determination;
    identifying a random message based at least in part on the probability;
    transmitting the random message to the customer;
    identifying a result of the random message; and
    updating the neural network, the user information, or both based on the result.

2. The method of claim 1, further comprising:
    refraining from transmitting to the user during a subsequent time period based on the MDP model.

3. The method of claim 1, further comprising:
    identifying a user interaction in response to the message; and
    updating the MDP model based on the user interaction.

4. The method of claim 1, further comprising:
selecting a time of day for transmitting the message based on the MDP model and the user information.

5. The method of claim 1, wherein the plurality of messages comprises email marketing messages.

6. The method of claim 1, wherein:
the plurality of message types comprises a nurture type, a promotional type, and a conversion type, and wherein the message is selected based on the categorization.

7. The method of claim 1, wherein the neural network approximates a Q-value for each message type of the plurality of message types from the user information.

8. The method of claim 1, further comprising:
computing a reward based on the customer interaction and the determined message type; and
updating training data based on the reward to obtain updated training data, wherein the neural network is updated based on the updated training data.

9. A system comprising:
a database storing user information for a plurality of users, the user information including user interaction data indicating an interest level of a user at a point in a user journey;
a message generation component configured to generate messages having a message type selected from a plurality of message types, wherein the plurality of message types correspond to interest levels representing the user journey;
a decision making component comprising a neural network that is trained based on user responses to the plurality of message types, wherein the neural network represents a policy function of a Markov Decision Process (MDP) model, and wherein an input to the neural network includes a state variable based on the user information, and an output of the neural network comprises a probability vector including a plurality of values corresponding to the plurality of message types, respectively;
a message transmission component configured to transmit a message to a user among the plurality of users determined by the decision making component; and
a data collection component configured to identify a user interaction in response to the transmitted message, update the user information based on the user interaction, and determine whether to transmit a subsequent message during a subsequent time period based on the updated user information, wherein:
the decision making component is further configured to:
identify a user subgroup for new behavior exploration;
determine that the customer belongs to the user subgroup;
identify a probability for a random delivery schedule based on the determination; and
identify a random message based at least in part on the probability;
and wherein the message transmission component is further configured to:
transmit the random message to the customer;
identify a result of the random message; and
update the neural network, the user information, or both based on the result.

10. The system of claim 9, wherein the neural network comprises input nodes corresponding to features of the user interaction data, one or more intermediate nodes, and output nodes corresponding to the message types.

11. The system of claim 9, further comprising:
a training component configured to update the neural network based on the user interaction data.

12. The system of claim 9, wherein:
the plurality of types includes a nurture type, a promotional type, and a conversion type.

13. A method of training a neural network, the method comprising:
training a deep Q-learning neural network representing a policy function of a Markov Decision Process (MDP) model comprising an action set including times of day and a plurality of message types corresponding to a customer journey, wherein the deep Q-learning neural network is trained based on customer responses to the plurality of message types;
identifying user information for a customer, wherein the user information includes user interaction data;
determining a message type from the plurality of message types and a time of day using the deep Q-learning neural network and the user information;
selecting a message based on the determined message type;
transmitting the message to the customer at the determined time of day based on the selection;
identifying a customer interaction in response to the message;
updating the deep Q-learning neural network based on the customer interaction; and
exploring additional subgroups for new behavior, wherein the exploring additional subgroups comprises:
identifying a user subgroup for new behavior exploration;
determining that the customer belongs to the user subgroup;
identifying a probability for a random delivery schedule based on the determination;
identifying a random message based at least in part on the probability;
transmitting the random message to the customer;
identifying a result of the random message; and
updating the neural network, the user information, or both based on the result.

* * * * *